Sept. 14, 1965   A. L. MILLER ETAL   3,205,538
FIBER RETRIEVER

Filed Aug. 15, 1963   6 Sheets-Sheet 1

INVENTORS
A.L. MILLER
H.W. WELLER, JR.
R.S. BROWN

BY R. Hoffman
ATTORNEY

Sept. 14, 1965  A. L. MILLER ETAL  3,205,538
FIBER RETRIEVER

Filed Aug. 15, 1963  6 Sheets-Sheet 2

INVENTORS
A.L. MILLER
H.W. WELLER, JR.
R.S. BROWN

BY R. Hoffman
ATTORNEY

Sept. 14, 1965   A. L. MILLER ETAL   3,205,538
FIBER RETRIEVER
Filed Aug. 15, 1963   6 Sheets-Sheet 3

INVENTORS
A.L. MILLER
H.W. WELLER, JR.
R.S. BROWN
BY R. Hoffman
ATTORNEY

Sept. 14, 1965    A. L. MILLER ETAL    3,205,538
FIBER RETRIEVER

Filed Aug. 15, 1963    6 Sheets-Sheet 5

INVENTORS
A.L. MILLER
H.W. WELLER, JR.
R.S. BROWN

BY  *R. Hoffman*
ATTORNEY

Sept. 14, 1965    A. L. MILLER ETAL    3,205,538
FIBER RETRIEVER

Filed Aug. 15, 1963    6 Sheets-Sheet 6

INVENTORS
A. L. MILLER
H. W. WELLER, JR.
R. S. BROWN

BY R. Hoffman

ATTORNEY

United States Patent Office 3,205,538
Patented Sept. 14, 1965

3,205,538
FIBER RETRIEVER
August L. Miller, New Orleans, Heber W. Weller, Jr., Metairie, and Roger S. Brown, New Orleans, La., assignors to the United States of America as represented by the Secretary of Agriculture
Filed Aug. 15, 1963, Ser. No. 302,486
3 Claims. (Cl. 19—204)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to improvements in textile processing machines and is a continuation in part of Serial No. 140,955, filed September 26, 1961, now abandoned.

The object of this invention is to reduce the loss of fiber in cleaning machines where nonfibrous material (dirt and trash) is normally removed by means of rotating cylinders, the surfaces of which revolve in close proximity to mote knives, grid bars, or perforated plates.

It is the objective of this invention to control and to direct the air currents in fiber cleaning machines so that the air currents work to prevent the loss of fiber and at the same time contributee to significantly higher cleaning efficiencies.

In general, the objects of this invention are achieved by eliminating the grid bars and the mote knives and providing at least one pair of esssentially planar partitions extending the full width of and directed outwardly from the cleaning cylinder, thus defining a trash-removal zone or zones.

We have discovered that exposing a transverse portion amounting to approximately ⅛ of the total of the peripheral surface of a cleaning cylinder (the lickerin of a carding apparatus for example) permits sufficient time for fiber and entangled trash to react to aerodynamic and centrifugal forces thus accomplishing separation of the trash. These aerodynamic and centrifugal forces position the heavier material for efficient separation from spinnable fiber.

In order that the invention may be understood by those skilled in the art, the apparatus is fully described below and in the accompanying drawings in which.

Figure 1:
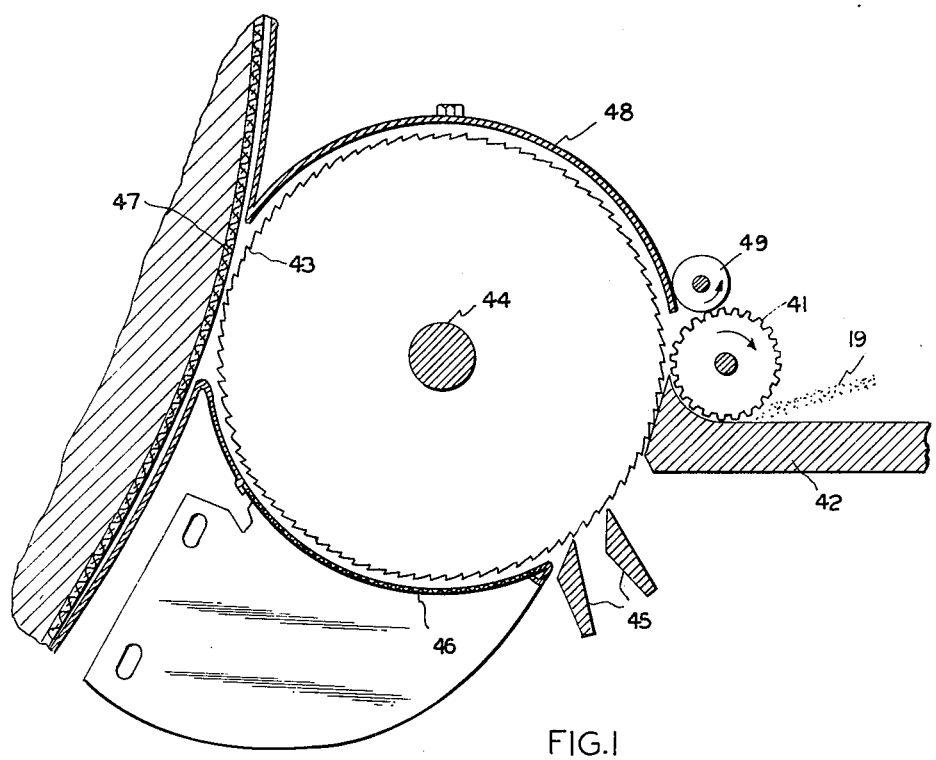
FIGURE 1 represents a cross section of a conventional card lickerin and is illustrative of one type of machine to which the present invention can be applied.
Figure 3:
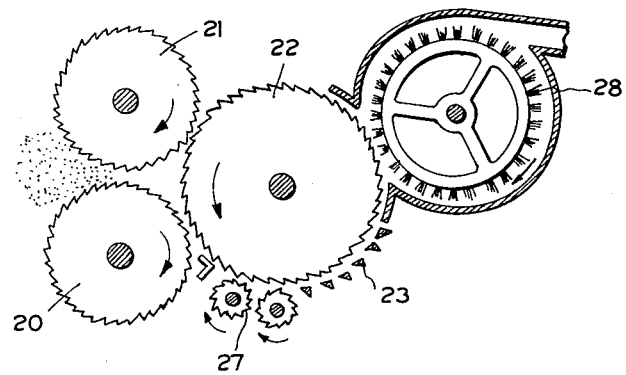
Figure 4:
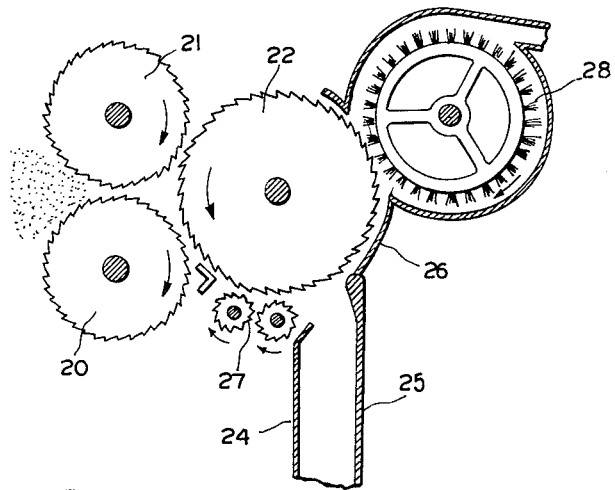
Figure 10:
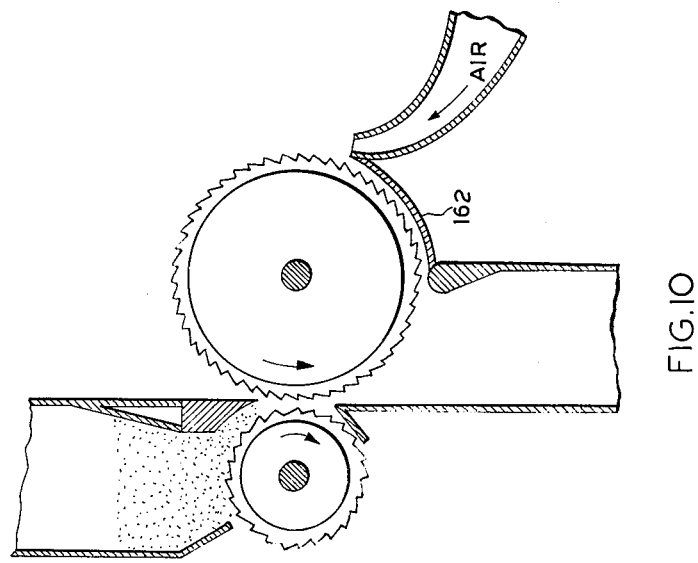
Figure 5:
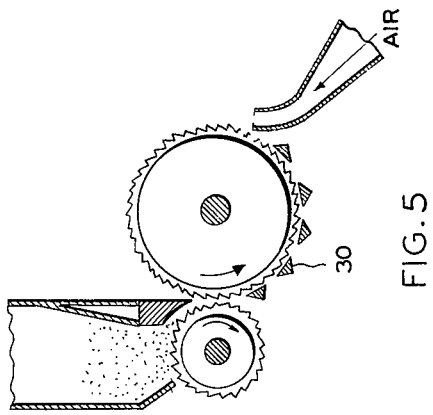
Figure 6:
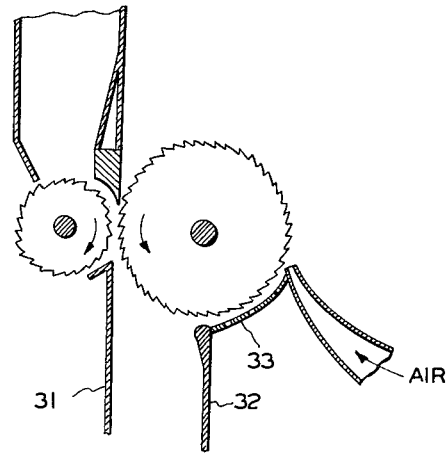
Figure 9:
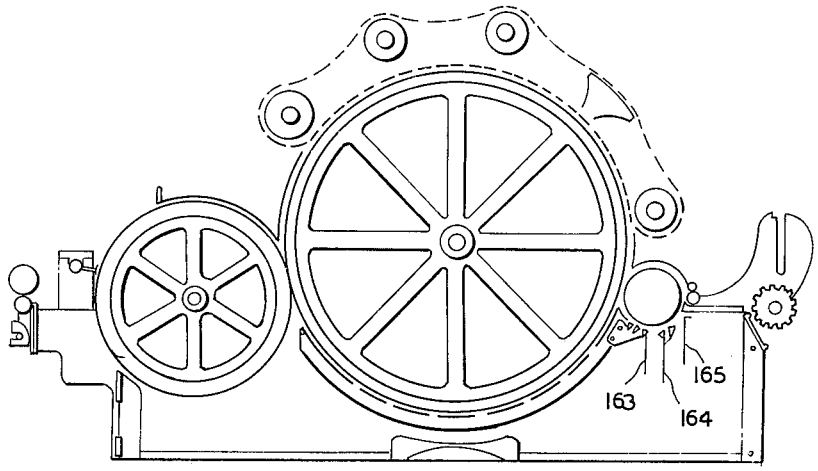
Figure 7:
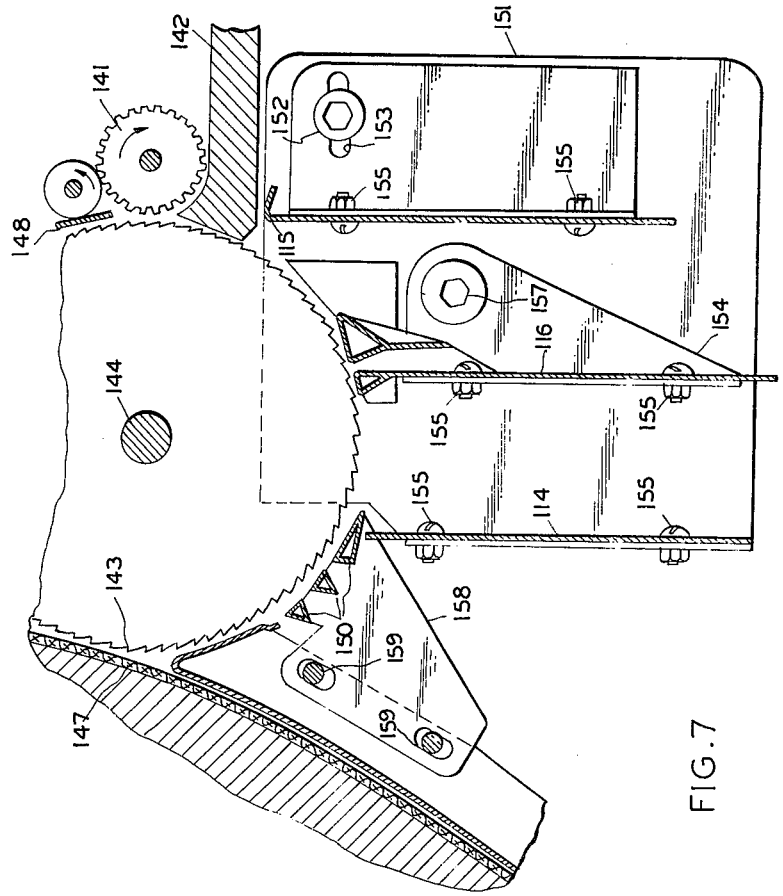
Figure 8:
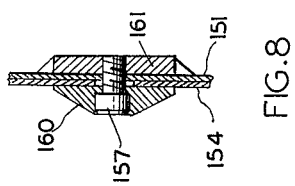

FIGURE 3 shows a portion of the machine disclosed in U.S. Patent No. 2,780,839, modified by adding combing cylinders 21 and 22 of FIGURE 1 of U.S. Patent No. 2,931,071 and doffer 11 of U.S. Patent No. 2,867,850, another machine to which the present invention is applicable;

FIGURE 4 shows the machine of FIGURE 3 modified according to one embodiment of the present invention;

FIGURE 5 shows parts 3, 4, 6, 7, and the nozzle portion of part 9 of FIGURE 1 of U.S. Patent No. 2,825,097 (the remaining parts being omitted for purposes of clarity), another machine to which the present invention is applicable;

FIGURE 6 shows the same portion of the machine of U.S. Patent No. 2,825,097, modified in accordance with one embodiment of the present invention;

FIGURE 7 is a cross section showing the conventional card lickerin modified in accordance with a second embodiment of the present invention namely, a plurality of essentially planar partitions extending the full width of and directed outwardly from the cleaning cylinder, thus defining a plurality of trash-removal zones;

FIGURE 8 is a cross section showing the detail of a cap screw, the slotted holes of the accompanying supported members and the friction elements, which combination permits movement of partition supporting brackets along the slotted hole and angular adjustment around the screw;

FIGURE 9 is a cross-section showing an over-all view of a carding machine modified in the vicinity of the lickerin with the second embodiment of the present invention as is illustrated in the enlarged view of the lickerin FIGURE 7; and FIGURE 10 shows a portion of the machine of U.S. Patent No. 2,825,097 as depicted in FIGURE 5 which machine has been modified in accordance with the present invention as depicted in FIGURE 6 but with the variation that consists of a contoured solid-surfaced cover.

In the conventional carding machine illustrated by FIGURE 1, cleaning is accomplished by carrying the fibers at relatively high speed on the surface of the lickerin cylinder 44, past mote knives 45, and the screen 46. The main function of the mote knives is to prevent an excessive loss of fiber by keeping the mass of fibers in close proximity to the lickerin cylinder surface. It is well known in the art of fiber cleaning that attempts to increase trash removal by use of higher lickerin speeds or by relocation of the mote knives will result in the excessive loss of spinnable fiber. The amount of spinnable fiber passing into the waste is a major limitation on the amount of cleaning that can be accomplished since waste, regardless of its fiber content, must be disposed of at a financial loss.

The loss of fiber in fiber cleaning machines is influenced to a considerable extent by air currents that are created by the revolving lickerin cylinder. The top section of the lickerin of a conventional carding apparatus is sealed as is shown in FIGURE 1 by cover 48 and a felt-covered roll 49, so that air cannot escape except downward past the nose of feed plate 42. The escape of air by this route contributes to the loss of spinnable fiber since additional air is aspirated from below the feed plate and blows downward past the mote knives.

At the normal lickerin speed of 450 r.p.m. an object on the surface of a lickerin is traveling at a speed of 1,060 feet per minute and the centrifugal force acting radially is approximately 26 times the weight of the object. Heavier particles, such as motes, tend to break loose from the lickerin teeth under this conditions and to travel in a straight line in a direction radial to the lickerin if they are not confined. This action works in favor of improved fiber cleaning.

However, simply exposing a portion of the peripheral surface of the lickerin will create service air turbulence which will in turn result in the loss of spinnable fiber.

The provision of a well-defined lateral and restricted transverse section or sections open at the bottom which section or sections includes a portion of the periphery of the lickerin and the provision of which section or sections is the object of this invention, restricts and controls the movement of air in the unobstructed peripheral area so that air movement toward the lickerin retrieves fiber that is normally lost.

Figure 2:
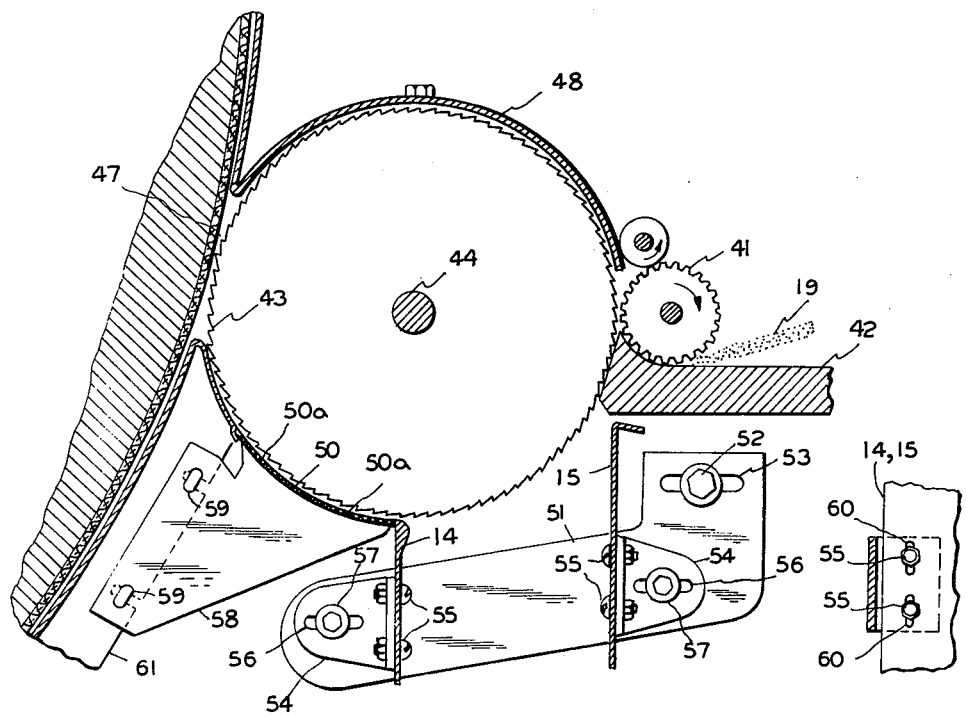
FIGURE 2 is a cross section showing the conventional card lickerin modified in accordance with one embodiment of the present invention.

FIGURE 2 shows one embodiment (a single transverse section) of the invention as applied to a conventional carding machine such as is depicted in FIGURE 1. Referring to FIGURE 2, the feed roll 41, the feed plate 42, lickerin teeth 43, lickerin cylinder 44, main cylinder teeth 47, and cover 48 are conventional as in FIGURE 1. Our invention consists of a single airflow channel formed by adjustable partitions 14 and 15. These adjustable partitions form two sides of the channel and the other two sides are formed by existing machine parts or, alternatively, brackets 51. The bottom of the channel (the end distal the lickerin cylinder) is open to the atmosphere.

The brackets for mounting partitions 14 and 15 can be any design that will permit universal adjustment and expose a minimum of obstructions for catching lint. One such type of bracket is shown in FIGURE 2 where a steel plate bracket 51 is mounted to the main frame of the machine (not shown) at each end of the partitions 14 and 15 and fastened by a cap screw 52 through a slotted hole 53 which permits movement of the bracket along the slotted hole an angular adjustment around the screw 52. Partitions 14 and 15 are fastened to the bracket 51 by angular brackets 54 which provide individual adjustment for each partition. The partitions are fastened to the brackets 54 by button head bolts 55. The holes in the partitions are slotted vertically to permit up and down adjustment. The hole 56 in bracket 54 is slotted to permit adjustment of the partitions in a horizontal direction. Angular adjustment is made by rotating the bracket 54 around the screw 57.

A peripheral cover, with means for adjustment, consisting of a perforated plate 50, with perforations indicated by 50a in FIGURE 2, as shown, or a series of spaced bars 150, as shown in FIGURE 7, is an essential part of the invention when the invention is applied to card lickerin.

The perforated cover 50 is mounted in a conventional manner by means of brackets 58 bolted to an existing part of the machine 61 through slotted holes 59 which permit adjusting the clearance and angle between cover 50 and lickerin teeth 43.

Partition 15 is designed and located to provide a variable size gap at the top. Partition 14 is designed with an aerodynamically smooth top edge adjacent to the lickerin cylinder that provides a smooth entry into the air stream around the lickerin surface. When the lickerin is operating, there is an upward movement of air in the channel formed by the two partitions said channel open at the bottom. This air movement is adjusted by setting the clearance between the teeth of the lickerin 43 and cover 50 so that air is discharged through the openings of the cover. On carding machine lickerins, airflow outward through the openings of perforated cover 50 is obtained by setting the clearance of the cover with respect to the lickerin greater at the leading edge than at the trailing edge. The movement of air between the two partitions toward the lickerin effectively retrieves fibers and in addition allows the heavier foreign matter such as trash and dirt to fall out. Fiber is carried back to the lickerin by the movement of air between the partitions and this air is subsequently discharged through the openings in the perforated cover 50. The openings in the cover are of such size that long fibers will not pass. Dust and very short fibers, however, are discharged with the air. Airflow through the perforated cover can also be created by enclosing its underside with a duct (not shown), which duct is provided with suction as from an external blower. This alternative method is applicable in cleaning processes where it is desirable to remove substantial amounts of short fiber from the material being processed. Referring again to FIGURE 2, the mote knives 45 shown in FIGURE 1 have been removed to expose a large unobstructed section of the lickerin cylinder. This facilitates trash removal but, as explained above, the exposure of such a large portion of lickerin cylinder would be impracticable without the partitions of this invention since the loss of spinnable fiber would be excessive.

Partitions 14 and 15 can be constructed of a suitable material, 12 to 18-gauge sheet metal being preferred. The edges of the partitions are preferably constructed as shown, but they can also be flanged, square, scalloped, or any other reasonable shape. The surfaces of the partitions are preferably smooth and straight, but they can also be corrugated, curved, and/or perforated.

FIGURE 7 shows a second embodiment of the invention as applied to a card lickerin. FIGURE 9 depicts the entire machine and shows the relative location of the transverse sections formed by partitions 163, 164, and 165. FIGURE 7 shows a plurality of partitions defining transverse sections that include a portion of the periphery of the lickerin. The several transverse sections are defined by a plurality of essentially planar partitions each of which together with its facing counterpart forms two sides of an airflow channel, the other two sides of the airflow channel being formed by existing machine parts or alternatively by brackets. As in the case of the first embodiment described above, the essentially planar partitions are adjustable with respect to lateral, to vertical, and to angular movement.

Referring to FIGURE 7, the feed roll 141, the feed plate 142, lickerin teeth 143, lickerin cylinder 144, main cylinder teeth 147, and cover 148 are convenional as in FIGURE 1.

The second embodiment of our invention consists of a plurality (two are shown in FIGURE 7) of airflow channels formed by partitions 114, 115, and 116. These partitions which are each and severally adjustable with respect to lateral, vertical and angular movement form the facing sides of two thus defined airflow channels, the other two facing sides of the air flow channels being formed by existing machine parts or alternatively by bracket 151.

The brackets for mounting partitions 114, 115, and 116 can be any design that permits universal adjustment with a minimum of obstructions for catching lint. One such method is shown in FIGURE 7 where a steel plate bracket 151 is mounted to the main frame of the machine and supports all three partitions. Bracket 151 is fastened to the main frame of the machine by a cap screw 152. Slotted hole 153 permits movement of the bracket 151 along the slotted hole. Partition 116 although supported by bracket 151 is mounted thereon through a separate bracket 154. Bracket 154 is fastened to bracket 151 by cap screw 157 which by virtue of a lateral slot in bracket 154 provides both lateral and angular adjustment of partition 116 relative the adjacent partitions 114 and 115. The several bolt holes in all of the partitions are slotted vertically to permit up and down adjustment and are secured with button head bolts 155.

FIGURE 8 is a detail (longitudinal cross section) of cap screw 157 showing the screw, the slotted hole in bracket 154, tapered washer 160 which washer prevents the collection of lint, and threaded plate fastener 161 which plate is integral bracket 151.

Bracket 158 which is attached to the peripheral cover of the main cylinder incorporates slotted holes 159 which holes serve as means for adjusting the bracket. Bracket 158, in addition, supports a series of spaced bars 150. The bracket assembly constitutes an essential part of the invention.

The cover bracket 158 is mounted in a conventional manner, bolted to an existing part of the machine through slotted holes 159 which permit adjusting the clearance and angle between the spaced bars 150 and lickerin teeth 143.

Partition 115 is designed and located to provide a variable size gap at the top. Partition 116 is designed with a top edge adjacent to the lickerin cylinder that provides a smooth entry into the air stream around the lickerin surface. When the lickerin is operating, there is an upward movement of air in the channels formed by the several partitions, said channels being open at the bottom (the end distal the lickerin). This air movement is adjusted by setting the clearance between the teeth of the lickerin 143 and the bracket supporting the spaced bars 150 so that air is discharged through the opening between the spaced bars. On carding machine lickerins, airflow outward through the openings between the spaced bars 150 is obtained by settting the clearance of the spaced bars relative the lickerin greater at the leading edge than at the trailing edge. The movement of air between the several partitions and toward the lickerin effectively retrieves fibers and in addition allows the heavier foreign matter such as trash and dirt to fall out. Fiber is carried back to the lickerin by the movement of air between the several partitions and this air is subsequently discharged through the openings between the spaced bars 150. Long fibers do not pass these openings but dust and very short fibers are discharged with the air. Airflow through the spaced bars can also be created by enclosing the area underside the spaced bars with a duct, which duct is provided with suction as from an external blower. This alternative method is applicable in cleaning processes where it is desirable to remove substantial amounts of short fiber from the material being processed. Referring again to FIGURE 7, the mote knives 45 shown in FIGURE 1 have been removed to expose a large unobstructed section of the lickerin cylinder. This facilitates trash removal but, as explained above, the exposure of such a large portion of lickerin cylinder would be impracticable without the partitions of this invention since the loss of spinnable fiber would be excessive.

Partitions 114, 115, and 116 can be constructed of any suitable material, 12 to 18-gauge sheet metal is preferred. The edges of the partitions are preferably constructed as shown, but they can also be flanged, square, scalloped, or any other reasonable shape. The surfaces of the partitions are preferably smooth and straight, but they can also be corrugated, curved, and/or perforated.

This invention is also applicable to other fiber cleaning machines, such as shown in FIGURES 3 and 5. In FIGURE 3 (U.S. Patent No. 2,780,839 modified as described above), the fiber is taken in by cylinders 20 and 21 and transferred to cylinder 22 which normally carries the fiber past combining rolls 27 and grid bars 23, for cleaning. The fiber is the removed by doffer 28. The present invention replaces the grid bars 23 with partitions 24 and 25 and perforated cover 26, as shown in FIGURE 4.

Likewise, on the portion of the cleaning machine U.S. Patent No. 2,825,097 as shown in FIGURE 5, the grid bars 30 are replaced with partitions 31 and 32 and perforated cover 33, as shown in FIGURE 6.

In the machines of FIGURES 4 and 6, the desired airflow between the partitions is produced by the suction which exists at the point of doffing the cleaning cylinder. Therefore, although covers 26 and 33 are shown perforated, these perforations are not essential to provide air movement and the covers may be solid (see cover 162 of FIGURE 10).

The following table presents test data obtained for purpose of comparison between a conventional machine and one equipped with the mechanism of this invention.

| Lickerin Mechanism | Present Waste at Lickerin | |
|---|---|---|
| | Fiber, Percent | Trash, Percent |
| Standard (Figure 1) | 0.59 | 1.16 |
| Standard with mote knives removed | 0.79 | 1.86 |
| This invention (Figure 2) | 0.45 | 1.86 |

We claim:
1. Apparatus for cleaning fibers and removing trash therefrom comprising:
 (a) a rotatable fiber-cleaning cylinder,
 (b) separate means for feeding fibers to and removing fibers from said cylinder,
 (c) at least two essentially planar facing partitions between said fiber-feeding and fiber-removing means extending transversely the full width of the cleaning cylinder directed outwardly away therefrom and exposing a portion amounting to approximately ⅛ of the total of the peripheral surface of the cleaning cylinder, said partitions facing in the direction of cylinder rotation and defining a trash removal zone open at the bottom,
 (d) means for adjusting the angular position and lateral displacement of at least one of said partitions with respect to the facing planar surface of said portions,
 (e) means for adjusting the distance of at least one of said partitions from the surface of the cleaning cylinder,
 (f) a contoured cover for said cleaning cylinder located immediately following said partitions in the direction of cylinder rotation, said cover being spaced from the surface of the cylinder and extending from the proximal partition to adjacent the fiber-removing means, and
 (g) means for adjustably securing the cover to the apparatus with respect to the distance of said cover from the cylinder and the tangential angle of said cover with the cylinder.

2. Apparatus for cleaning fibers and removing trash therefrom comprising:
 (a) a rotatable fiber-cleaning cylinder,
 (b) separate means for feeding fibers to and removing fibers from said cylinder,
 (c) at least two essentially planar facing partitions between said fiber-feeding and fiber-removing means extending transversely the full width of the cleaning cylinder and directed outwardly away therefrom, said partitions facing in the direction of cylinder rotation and defining a trash removal zone open at the bottom,
 (d) means for adjusting the angular positions and lateral displacement of at least one of said partitions with respect to the facing planar surface of another of said partitions,
 (e) means for adjusting the distance of at least one of said partitions from the surface of the cleaning cylinder,
 (f) a contoured cover for said cleaning cylinder located immediately following said partitions in the direction of cylinder rotation, said cover being spaced from the surface of the cylinder and extending from the proximal partition to adjacent the fiber-removing means, the edge near the cylinder of said proximal partition being provided with an aerodynamically smooth surface, and
 (g) means for adjustably securing the cover to the apparatus with respect to the distance of said cover from the cylinder and the tangential angle of said cover with the cylinder.

3. Apparatus for cleaning fibers and removing trash therefrom comprising:
 (a) a rotatable fiber-cleaning cylinder,
 (b) separate means for feeeding fibers to and removing fibers from said cylinder,
 (c) at least two essentially planar facing partitions between said fiber-feeding and fiber-removing means extending transversely the full width of the cleaning cylinder and directed outwardly away therefrom, said partitions facing in the direction of cylinder rotation and defining a trash removal zone open at the bottom.
 (d) means for adjusting the angular position and lateral displacement of at least one of said partitions with respect to the facing planar surface of another of said partitions,
 (e) means for adjusting the distance of at least one of said partitions from the surface of the cleaning cylinder,
 (f) a contoured perforated cover for said cleaning cylinder located immediately following said partitions in the direction of cylinder rotation, said cover being spaced from the surface of the cylinder and extending from the proximal partition to adjacent the fiber-removing means, the edge near the cylinder of said proximal partition being provided with an aerodynamically smooth surface, and (g) means for adjustably securing the cover to the apparatus with respect to the distance of said cover from the cylinder and the tangential angle of said cover with the cylinder.

References Cited by the Examiner

UNITED STATES PATENTS

| | | | |
|---|---|---|---|
| 482,395 | 9/92 | Sullivan | 19—105 |
| 1,299,185 | 4/19 | Howorth | 19—96 |
| 1,558,414 | 10/25 | Thoma | 19—105 |
| 1,559,475 | 10/25 | Thoma | 19—105 |
| 2,369,893 | 2/45 | Gwaltney | 19—95 X |

FOREIGN PATENTS 613,155  8/26  France.

DONALD W. PARKER, *Primary Examiner.*